(12) United States Patent
Tsukada et al.

(10) Patent No.: US 10,428,902 B2
(45) Date of Patent: Oct. 1, 2019

(54) SYNCHRONIZER-MECHANISM-EQUIPPED TRANSMISSION

(71) Applicant: HONDA MOTOR CO., LTD., Tokyo (JP)

(72) Inventors: Yoshiaki Tsukada, Wako (JP); Yoshihisa Kanno, Wako (JP); Kazuhiko Nakamura, Wako (JP); Hiroyuki Kojima, Wako (JP); Takashi Ozeki, Wako (JP); Hiroshi Takamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 220 days.

(21) Appl. No.: 15/078,117

(22) Filed: Mar. 23, 2016

(65) Prior Publication Data
US 2016/0290441 A1    Oct. 6, 2016

(30) Foreign Application Priority Data

Mar. 30, 2015  (JP) .................................. 2015-069994

(51) Int. Cl.
*F16H 3/091* (2006.01)
*F16H 63/30* (2006.01)
(Continued)

(52) U.S. Cl.
CPC .............. *F16H 3/091* (2013.01); *F16D 11/00* (2013.01); *F16D 23/02* (2013.01); *F16D 23/06* (2013.01);
(Continued)

(58) Field of Classification Search
CPC .. F16D 11/00; F16D 2023/0681; F16D 23/02; F16D 23/06; F16H 2061/0474;
(Continued)

(56) References Cited

U.S. PATENT DOCUMENTS

| 4,573,371 A * | 3/1986 | Akutagawa ............. F16D 23/06 74/339 |
| 7,752,936 B2 * | 7/2010 | Kobayashi ............ B60W 10/02 74/337.5 |

(Continued)

FOREIGN PATENT DOCUMENTS

| JP | 10103431 A * | 4/1998 |
| JP | 2004-125112 A | 4/2004 |
| JP | 2008-215555 A | 9/2008 |

OTHER PUBLICATIONS

JP 10103431 A (Noboru Ashikawa) Sep. 30, 1998. [online] [retrieved on Feb. 15, 2019]. Retrieved from: Proquest Dialog. (Year: 1998).*

*Primary Examiner* — Victor L Macarthur
*Assistant Examiner* — Joseph Brown
(74) *Attorney, Agent, or Firm* — Birch, Stewart, Kolasch & Birch, LLP

(57) ABSTRACT

A synchronizer-mechanism-equipped transmission capable of moving tips of sleeve teeth and ring teeth away from butting each other by moving a synchronizer sleeve with biasing means even if the tips of the sleeve teeth and ring teeth are in contact when actuator driving stops. When sleeve teeth of a synchronizer sleeve that moves during gear shifting are located at a first synchronization position where the sleeve teeth begin to come into contact with ring teeth, a pressing member of a detent mechanism is in contact with a pre-gear-shifting detent recessed portion of a star cam.

13 Claims, 10 Drawing Sheets

(51) Int. Cl.
*F16D 11/00* (2006.01)
*F16D 23/02* (2006.01)
*F16H 63/32* (2006.01)
*F16H 61/04* (2006.01)
*F16H 63/18* (2006.01)
*F16H 63/38* (2006.01)
*F16D 23/06* (2006.01)
*F16H 3/00* (2006.01)

(52) U.S. Cl.
CPC ............ *F16H 61/04* (2013.01); *F16H 63/18* (2013.01); *F16H 63/30* (2013.01); *F16H 63/32* (2013.01); *F16H 63/38* (2013.01); *F16D 2023/0681* (2013.01); *F16H 3/006* (2013.01); *F16H 2061/0474* (2013.01); *F16H 2063/3093* (2013.01); *F16H 2063/321* (2013.01)

(58) Field of Classification Search
CPC ....... F16H 2063/3093; F16H 2063/321; F16H 3/006; F16H 3/091; F16H 61/04; F16H 63/18; F16H 63/32; F16H 63/38; F16H 63/30
See application file for complete search history.

(56) References Cited

U.S. PATENT DOCUMENTS

| | | | | |
|---|---|---|---|---|
| 9,829,093 | B2* | 11/2017 | Nitani | F16H 61/0213 |
| 2008/0184844 | A1* | 8/2008 | Mizuno | F16H 61/32 74/664 |
| 2008/0220936 | A1* | 9/2008 | Kobayashi | B60W 10/02 477/70 |
| 2009/0025498 | A1* | 1/2009 | Sotani | F16H 61/18 74/404 |
| 2010/0050805 | A1* | 3/2010 | Hayakawa | F16H 63/18 74/473.28 |
| 2011/0226080 | A1* | 9/2011 | Ieda | F16H 63/14 74/473.36 |
| 2014/0090498 | A1* | 4/2014 | Kojima | F16H 61/688 74/331 |
| 2014/0290405 | A1* | 10/2014 | Sugano | F16H 3/02 74/335 |

* cited by examiner

SYNCHRONIZER-MECHANISM-EQUIPPED TRANSMISSION

CROSS-REFERENCE TO RELATED APPLICATIONS

The present application claims priority under 35 USC 119 to Japanese Patent Application No. 2015-069994 filed Mar. 30, 2015 the entire contents of which are hereby incorporated by reference.

BACKGROUND OF THE INVENTION

1. Field of the Invention

The present invention relates to a transmission. More particularly, to a synchronizer-mechanism-equipped transmission.

2. Description of Background Art

A synchronizer mechanism for a transmission is known. See, for example, Japanese Patent Laid-Open No. 2004-125112.

In the synchronizer mechanism disclosed in Japanese Patent Laid-Open No. 2004-125112, ring gear teeth (ring teeth) formed on an outer ring (synchronizer ring) of a blocking ring come between gear teeth (gear dog teeth) and spline teeth (sleeve teeth). The gear teeth are formed on a first transmission gear that is pivotally supported in a relatively rotatable manner on each of main and counter shafts, each being a rotating shaft. The sleeve teeth are formed on a sleeve (synchronizer sleeve) that is pivotally supported on the rotating shaft in such a manner so as to be restricted in relative rotation and axially movable. During gear shifting, the synchronizer sleeve moves, causing the sleeve teeth to come into contact and mesh with the ring teeth first and then come into contact and mesh with the gear dog teeth. This causes the synchronizer sleeve (and the rotating shaft) and the first transmission gear to be synchronized and coupled together.

A mechanism that includes a shift drum and a shift fork is generally known as a transmission drive mechanism for moving the synchronizer sleeve with an actuator so as to shift gears by achieving synchronization and coupling using a synchronizer mechanism. The shift drum is driven to rotate by an actuator. The shift fork is guided by a lead groove of the shift drum to move axially as a result of rotation of the shift drum. The shift fork engages with the synchronizer sleeve, thus moving the synchronizer sleeve. See, for example, Japanese Patent Laid-Open No. 2008-215555.

Then, the transmission drive mechanism has a detent mechanism to position the shift drum at a predetermined rotation position for each gear position.

A detent mechanism normally has a star cam. An uneven cam surface is formed on an outer circumferential end surface of the star cam. Detent recessed portions, associated with gear positions, and tapered and pointed projecting portions are circumferentially and sequentially formed on the uneven cam surface in such a manner as to alternate continuously. The star cam is provided to rotate integrally with the shift drum. Biasing means causes a roller to come into contact with and press the uneven cam surface of the star cam, causing the roller to slip into the required detent recessed portion. As a result, the shift drum is rotated and biased together with the star cam, thus positioning the shift drum at a predetermined rotation position. See, for example, Japanese Patent Laid-Open No. 2008-215555.

When the shift drum is driven to rotate by the actuator during gear shifting, the star cam of the detent mechanism rotates integrally with the shift drum. At the same time, the synchronizer sleeve is moved by the shift fork that has been guided into the lead groove of the rotating shift drum, causing the sleeve teeth of the synchronizer mechanism to come into contact and mesh with the ring teeth and then come into contact and mesh with the gear dog teeth. As a result, the synchronizer sleeve and the transmission gear are synchronized and coupled together.

The frictional resistance to which the synchronizer sleeve is subjected varies from one stage to another during the time period from when the sleeve teeth come into contact and mesh with the ring teeth to when the sleeve teeth come into contact and mesh with the gear dog teeth in the course of the movement of the synchronizer sleeve driven by the actuator.

On the other hand, while the synchronizer sleeve moves, the star cam that is provided integrally with the shift drum rotates with the roller pressed onto the uneven cam surface by the biasing means. As a result, the roller that is pressing a pre-gear-shifting detent recessed portion climbs over the projecting portion of the star cam thanks to the rotation of the star cam, causing the roller to press a post-gear-shifting detent recessed portion.

Therefore, the biasing force exerted by the biasing means to press the roller onto the uneven cam surface of the star cam is opposite in direction between before and after the roller climbs over the projecting portion of the star cam.

If actuator driving stops for some reason while the star cam is driven to rotate and move the synchronizer sleeve, and if, as a result, the force exerted by the actuator to rotate the shift drum, i.e. the star cam, is lost, the frictional force to which the synchronizer sleeve is subjected is larger than the biasing force exerted by the biasing means to move the synchronizer sleeve by rotating and biasing the star cam and the shift drum, depending on the position of the synchronizer sleeve of the synchronizer mechanism. As a result, the shift drum may stop at a rotation position halfway through shifting.

When the shift drum stops at a rotation position halfway through shifting because actuator driving stops, and if, at this moment, the synchronizer sleeve of the synchronizer mechanism is located where the sleeve teeth come into contact with the ring teeth, the tips of the teeth continuously butt each other, which is not preferred.

SUMMARY AND OBJECTS OF THE INVENTION

The present invention has been devised in light of the foregoing, and it is an object of an embodiment of the present invention to provide a synchronizer-mechanism-equipped transmission capable of moving tips of sleeve teeth and ring teeth away from butting each other by moving a synchronizer sleeve with biasing means even if the tips of the sleeve teeth and ring teeth are in contact when actuator driving stops.

In order to solve the above problem, a synchronizer-mechanism-equipped transmission according to an embodiment of the present invention includes a gear transmission mechanism, a synchronizer mechanism, a transmission drive mechanism and a detent mechanism. The gear transmission mechanism has a plurality of driving transmission gears pivotally supported on a main shaft and a plurality of driven transmission gears pivotally supported on a counter shaft. The driving transmission gears and the driven transmission gears constantly mesh with each other for each gear ratio. In the synchronizer mechanism, ring teeth formed on a synchronizer ring come between gear dog teeth and sleeve teeth.

The gear dog teeth are formed on a first transmission gear that is pivotally supported in a relatively rotatable manner on at least one of the main shaft and the counter shaft, each being a rotating shaft. The sleeve teeth are formed on a second transmission gear or a synchronizer sleeve as a moving sleeve that is pivotally supported on the rotating shaft in such a manner as to be restricted in relative rotation and axially movable. During gear shifting, the synchronizer sleeve moves and causes the sleeve teeth to come into contact and mesh with the ring teeth first and then come into contact and mesh with the gear dog teeth so that the synchronizer sleeve and the first transmission gear are synchronized and coupled together. The transmission drive mechanism includes a shift drum and a shift fork. The shift drum is driven to rotate by an actuator. The shift fork is guided by a lead groove of the shift drum to move axially as a result of rotation of the shift drum. The shift fork engages with the synchronizer sleeve so as to move the synchronizer sleeve. The detent mechanism has a star cam. An uneven cam surface is formed on an outer circumferential end surface of the star cam. Detent recessed portions associated with gear positions and projecting portions are formed on the uneven cam surface in such a manner as to alternate continuously. The star cam is provided to rotate integrally with the shift drum. Biasing means causes a pressing member to come into contact with and press the uneven cam surface of the star cam and causes the pressing member to slip into a required detent recessed portion. As a result, the shift drum is rotated and biased together with the star cam so as to be positioned. When the sleeve teeth of the synchronizer sleeve that moves during gear shifting are located at a first synchronization position where the sleeve teeth begin to come into contact with the ring teeth, the pressing member of the detent mechanism is in contact with a pre-gear-shifting detent recessed portion of the star cam.

According to an embodiment of the present invention, even if actuator driving stops when the sleeve teeth of the synchronizer sleeve that moves during gear shifting are located at the first synchronization position where the sleeve teeth begin to come into contact with the ring teeth, the pressing member of the detent mechanism is in contact with the pre-gear-shifting detent recessed portion of the star cam. As a result, there is almost no frictional resistance to the movement of the sleeve teeth back to where the sleeve teeth were before the sleeve teeth came into contact with the ring teeth. Therefore, the biasing means causes the pressing member to come into contact with and press a sloped surface of the pre-gear-shifting detent recessed portion of the star cam, rotating the star cam with almost no resistance and bringing the shift drum back to the predetermined pre-gear-shifting rotation position and moving the synchronizer sleeve of the synchronizer mechanism back to its initial proper position. This moves the tips of the sleeve teeth and the ring teeth away from butting each other, thus avoiding continuous butting therebetween.

According to an embodiment of the present invention, when the sleeve teeth of the synchronizer sleeve that moves during gear shifting are located at a second synchronization position where the sleeve teeth begin to come into contact with the gear dog teeth, the pressing member of the detent mechanism may be in contact with a post-gear-shifting detent recessed portion of the star cam.

According to an embodiment of the present invention, if actuator driving stops when the sleeve teeth of the synchronizer sleeve that moves during gear shifting are located at the second synchronization position where the sleeve teeth begin to come into contact with the gear dog teeth, the pressing member of the detent mechanism is in contact with the post-gear-shifting detent recessed portion of the star cam. As a result, a biasing force acts on the synchronizer sleeve in the direction of accelerating gear shifting. Therefore, even if the sleeve teeth of the synchronizer sleeve are in contact with the gear dog teeth, but when the tips thereof are about to butt each other, the biasing means can bias the synchronizer sleeve in the direction of moving the tips of the sleeve teeth and the gear dog teeth away from butting each other.

According to an embodiment of the present invention, a roller pivotally supported at a tip of a detent arm that is biased by the biasing means may come into contact with and press the uneven cam surface of the star cam as the pressing member of the detent mechanism.

According to an embodiment of the present invention, a detent mechanism of a simple structure is used. In the detect mechanism, a roller that is pivotally supported on the tip of the detent arm biased by the biasing means comes into contact with and presses the uneven cam surface of the star cam. This allows the detent mechanism to be compactly incorporated into the transmission for downsizing and for a weight reduction of the transmission.

According to an embodiment of the present invention, when the sleeve teeth of the synchronizer sleeve that moves during gear shifting are located at the first synchronization position where the sleeve teeth begin to come into contact with the ring teeth, the pressing member of the detent mechanism is in contact with the pre-gear-shifting detent recessed portion of the star cam. Therefore, even if actuator driving stops at the first synchronization position, there is almost no frictional resistance to the movement of the sleeve teeth back to where the sleeve teeth were before the sleeve teeth came into contact with the ring teeth. Therefore, the biasing means causes the pressing member to come into contact with and press the sloped surface of the pre-gear-shifting detent recessed portion of the star cam, rotating the star cam with almost no resistance and bringing the shift drum back to the predetermined pre-gear-shifting rotation position and moving the synchronizer sleeve of the synchronizer mechanism back to its initial proper position. This moves the tips of the sleeve teeth and ring teeth away from butting with each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A description will be given below of an embodiment according to the present invention withe reference to FIGS. 1 to 10.

Figure 1:
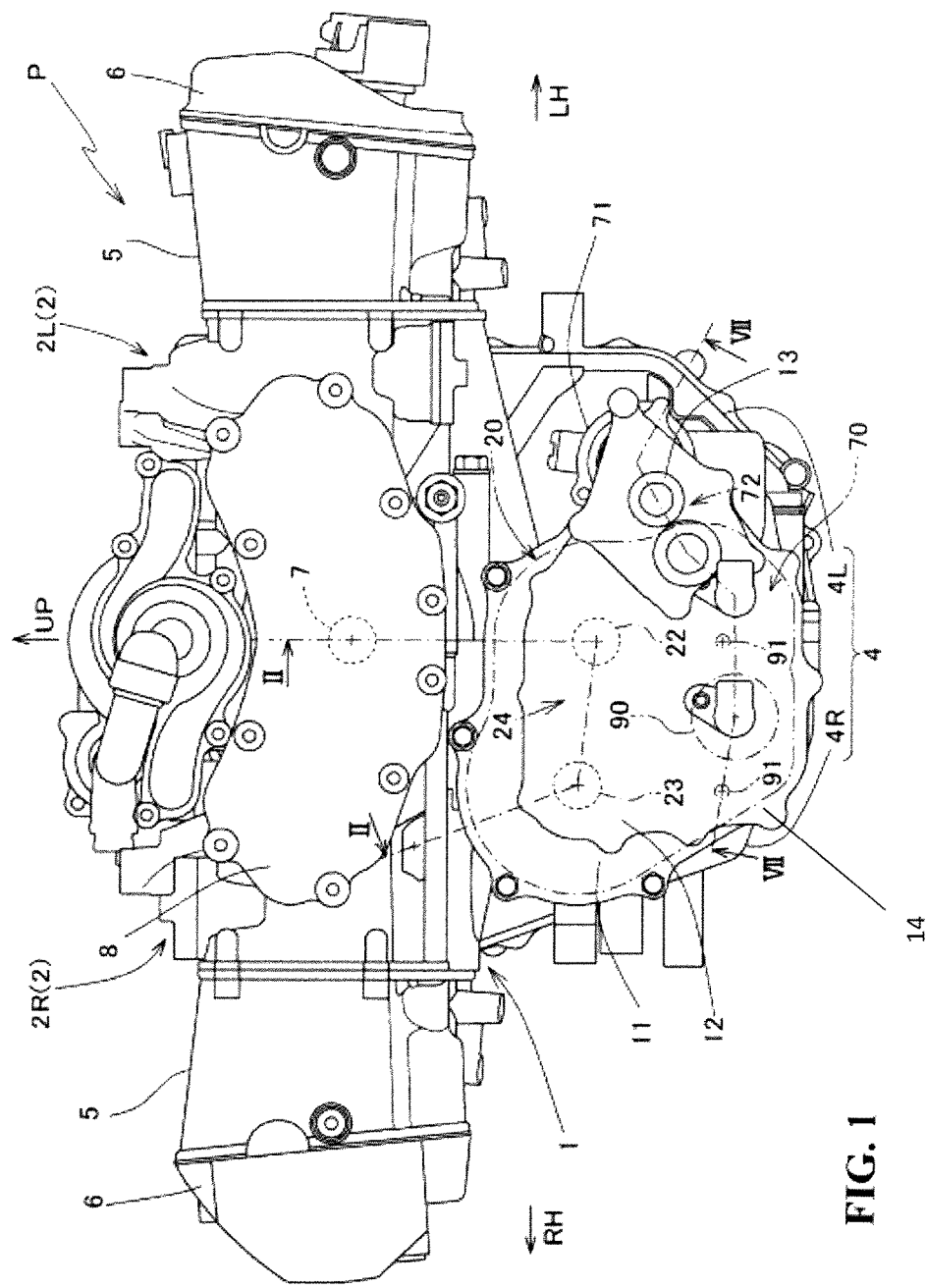
FIG. 1 is a partially omitted front view of a power unit used in an embodiment of the present invention.

FIG. 1 is a partially omitted front view of a power unit P used for a synchronizer-mechanism-equipped transmission 20 according to a first embodiment of the present invention.

The power unit P is mounted to a motorcycle and includes an internal combustion engine 1 and the synchronizer-mechanism-equipped transmission 20. The internal combustion engine 1 is a so-called vertically mounted, horizontally opposed six cylinder water-cooled four stroke cycle engine with a crankshaft 7 running longitudinally along the vehicle. The transmission 20 is coupled to the internal combustion engine 1 and shifts power of the internal combustion engine 1 to a predetermined gear position.

It should be noted that, in the present specification, the longitudinal and horizontal orientations are as per normal criteria that consider the direction in which the motorcycle moves straight ahead as forward.

Further, the forward, rearward, leftward, rightward, upward, and downward directions in the drawings are denoted by reference symbols FR, RR, LH, RH, UP, and DW, respectively.

As illustrated in FIG. 1, the internal combustion engine 1 includes an engine block 2, cylinder heads 5, and head covers 6. The engine block 2 is made up of a left engine block half 2L disposed on the left side and a right engine block half 2R disposed on the right side when facing forward in the motorcycle traveling direction. The cylinder heads 5 are coupled to left and right ends of the left and right engine block halves 2L and 2R, respectively. Each of the head covers 6 is attached to one of the cylinder heads 5.

As illustrated in FIG. 1, a front cover 8 is mounted to a top front surface of the engine block 2 to cover the top front surface of the engine block 2, and mainly the crankshaft 7.

Further, a transmission chamber 14 (shown by a long dashed short dashed line in FIG. 1) that houses a gear transmission mechanism 21 of the synchronizer-mechanism-equipped transmission 20, which will be described later, is defined by left and right crankcase halves 4L and 4R on a bottom portion of the engine block 2.

As illustrated in FIG. 1, a transmission holder 11 is mounted to a bottom front surface of the crankcase 4 in such a manner so as to cover the front side of the transmission chamber 14. A transmission drive system holder 12 is mounted to an area of a front surface of the transmission holder 11 extending from the center to the bottom thereof to hold a transmission drive mechanism 70. The transmission drive mechanism 70 operates the gear position of the gear transmission mechanism 21.

A reduction gearing cover 13 is mounted to a left end front surface of the transmission drive system holder 12. A reduction gear mechanism 72 is arranged inside a reduction gearing chamber 15 that is surrounded by the transmission drive system holder 12 and the reduction gearing cover 13. The reduction gear mechanism 72 will be described later.

Further, a shift motor 71, an actuator serving as a power source of the transmission drive mechanism 70, is provided on a left end rear surface of the transmission drive system holder 12.

As illustrated in FIG. 1, a main shaft 22, a counter shaft 23, a shift drum 90, shift fork shafts 91, and so on of the gear transmission mechanism 21 are integrally assembled in a small set as a cassette unit and provided on a rear surface of the transmission holder 11.

The main shaft 22, the counter shaft 23, the shift drum 90, and the shift fork shafts 91 inserted into the transmission chamber 14 are arranged to point longitudinally so as to run parallel with the crankshaft 7.

Further, as illustrated in FIG. 1, the main shaft 22 is arranged under the crankshaft 7, and the counter shaft 23 is arranged to the right of the main shaft 22.

The shift drum 90 is arranged on the bottom center of the transmission chamber 14. Two shift fork shafts 91 are arranged, one on the right and the other on the left of the shift drum 90, under the main shaft 22 and the counter shaft 23.

Figure 2:
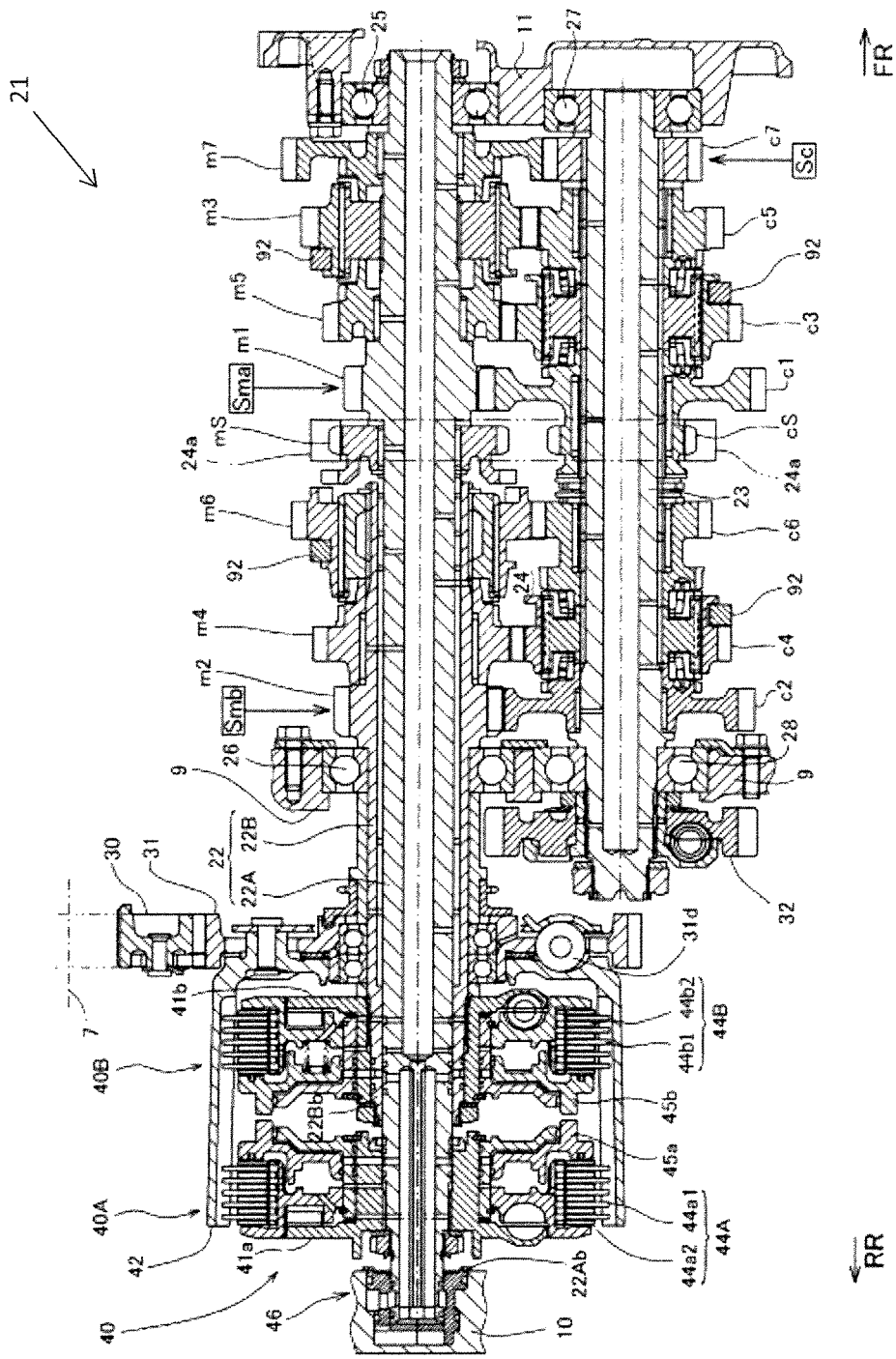
FIG. 2 is a sectional view of a gear transmission mechanism taken along line II-II shown in FIG. 1.

FIG. 2 is a sectional view of the gear transmission mechanism 21 taken along line II-II shown in FIG. 1.

As illustrated in FIG. 2, the gear transmission mechanism 21 made up of the main shaft 22, the counter shaft 23, and a group of transmission gears includes a twin clutch 40.

The main shaft 22 that points in the longitudinal direction of the gear transmission mechanism 21 includes odd and even gear position main shafts 22A and 22B. The odd gear position main shaft 22A is long and pivotally supports odd gear position driving transmission gears m1, m3, m5, and m7. The even gear position main shaft 22B is fitted in a relatively rotatable manner onto the odd gear position main shaft 22A via a needle bearing (not shown). The even gear position main shaft 22B is short and pivotally supports even gear position driving transmission gears m2, m4, and m6.

The odd gear position main shaft 22A has its front end supported on the transmission holder 11 via a ball bearing 25 and its rear end supported on a clutch cover 10 in a freely rotatable manner.

The even gear position main shaft 22B has its middle area supported on a rear cover 9 via a ball bearing 26.

On the other hand, the counter shaft 23, arranged on the right of the main shaft 22 to run parallel with the main shaft 22, has its front end supported on the transmission holder 11 via a ball bearing 27, and its rear side portion penetrating the rear cover 9 and supported on the rear cover 9 via a ball bearing 28.

A secondary driving gear 32 is spline-fitted to the rear end portion of the counter shaft 23 that penetrates the rear cover 9.

Between the ball bearing 25 at the front end and the ball bearing 26 in the middle, both of which support the main shaft 22, the odd gear position driving transmission gears m1, m3, m5, and m7 are provided on a front side portion of the odd gear position main shaft 22A that is more exposed forward than the even gear position main shaft 22B, and the even gear position driving transmission gears m2, m4, and m6 are provided on a front side portion of the even gear position main shaft 22B.

On the other hand, driven transmission gears c1 to c7 that constantly mesh with the driving transmission gears m1 to m7, respectively, are provided on the counter shaft 23.

Further, reversing sprockets mS and cS are provided at opposed positions of the odd gear position main shaft 22A and the counter shaft 23, with a chain 24a passed over the sprockets mS and cS.

The gear transmission mechanism 21 is made up of the driving transmission gears m1 to m7, the driven transmission gears c1 to c7, and the reversing sprockets mS and cS.

The third speed driving transmission gear m3 and the sixth speed driving transmission gear m6 are shifter gears that can slide axially on the main shaft 22. The third speed and sixth speed driving transmission gears m3 and m6 are selectively connected to the adjacent driving transmission gears m2, m4, m5, and m7 or the reversing sprocket mS via a synchronizer mechanism S.

Further, the fourth speed driven transmission gear c4 and the third speed driven transmission gear c3 are shifter gears that can slide axially on the counter shaft 23. The fourth speed and third speed driven transmission gears c4 and c3 are selectively connected to the adjacent driven transmission gears c1, c2, c5, and c6 via the synchronizer mechanism S.

A fork engagement groove 52b is provided on each of the above shifter gears, and a shift fork 92 that engages with the fork engagement groove 52b causes the shifter gears to move axially.

As illustrated in FIG. 2, the twin clutch 40 is provided on a rear half portion of the main shaft 22 that is arranged to protrude more rearward than the rear cover 9.

The twin clutch 40 is configured as a so-called twin clutch system having odd and even gear position hydraulic clutches 40A and 40B and a clutch outer 42. The odd gear position hydraulic clutch 40A is connected to the odd gear position main shaft 22A. The even gear position hydraulic clutch 40B is connected to the even gear position main shaft 22B.

An odd gear position clutch inner 41a of the odd gear position hydraulic clutch 40A is spline-fitted in such a manner as to be restricted in axial motion near a rear end portion 22Ab of the odd gear position main shaft 22A that is arranged to protrude rearward from a rear end portion 22Bb of the even gear position main shaft 22B.

An even gear position clutch inner 41b of the odd gear position hydraulic clutch 40B is spline-fitted in such a manner as to be restricted in axial motion near the rear end portion 22Bb of the even gear position main shaft 22B.

The clutch outer 42 is supported on a primary driven gear 31 via a cushioning member 31d. The primary driven gear 31 is supported on the even gear position main shaft 22B in a freely rotatable manner between the even gear position hydraulic clutch 40B and the rear cover 9.

The primary driven gear 31 meshes with a primary driving gear 30 that is fitted to the crankshaft 7 so that the rotational driving force supplied from the crankshaft 7 is reduced at a predetermined gear reduction ratio and transferred to the twin clutch 40.

Between the clutch outer 42 and the odd gear position clutch inner 41a, an odd gear position friction disk group 44A is provided in such a manner so as to permit pressurization by an odd gear position pressurizing plate 45a. The odd gear position friction disk group 44A has driving friction disks 44a1 and driven friction disks 44a2 that are arranged alternately. The driving friction disks 44a1 rotate together with the clutch outer 42. The driven friction disks 44a2 rotate together with the odd gear position clutch inner 41a.

Further, between the clutch outer 42 and the even gear position clutch inner 41b, an even gear position friction disk group 44B is provided in such a manner so as to permit pressurization by an even gear position pressurizing plate 45b. The even gear position friction disk group 44B has driving friction disks 44b1 and driven friction disks 44b2 that are arranged alternately. The driving friction disks 44b1 rotate together with the clutch outer 42. The driven friction disks 44b2 rotate together with the even gear position clutch inner 41b.

A hydraulic circuit 46 is provided on the odd gear position main shaft 22A and the clutch cover 10. The hydraulic circuit 46 can selectively drive the odd and even gear position pressurizing plates 45a and 45b.

The hydraulic circuit 46 selectively supplies hydraulic pressure to the odd and even gear position hydraulic clutches 40A and 40B. When one of the odd and even gear position hydraulic clutches 40A and 40B is connected, the other is disconnected.

When the odd gear position hydraulic clutch 40A is connected by the hydraulic circuit 46, the rotation of the clutch outer 42 of the twin clutch 40 to which the rotation of the crankshaft 7 has been transferred via the meshing of the primary driving and driven gears 30 and 31 is transferred to the odd gear position main shaft 22A, thus rotating the odd gear position main shaft 22A. When the even gear position hydraulic clutch 40B is connected, the rotation of the clutch outer 42 is transferred to the even gear position main shaft 22B, thus rotating the even gear position main shaft 22B.

Power transferred from the crankshaft 7 to the odd or even gear position main shaft 22A or 22B via the twin clutch 40 is transferred to the counter shaft 23 by a selectively established gear position by means of the gear transmission mechanism 21.

The synchronizer mechanism S is provided between each shifter gear and the transmission gear connected thereto in the present gear transmission mechanism 21 to establish respective gear positions while at the same time synchronizing these positions.

A description will be given below of the synchronizer mechanism S with reference to FIGS. 3 and 4. The synchronizer mechanism S is interposed between the second speed driven transmission gear c2, of all the gear positions, that establishes the second gear position and the fourth speed driven transmission gear c4, a shifter gear.

Other synchronizer mechanisms are the same as the above.

Figure 3:
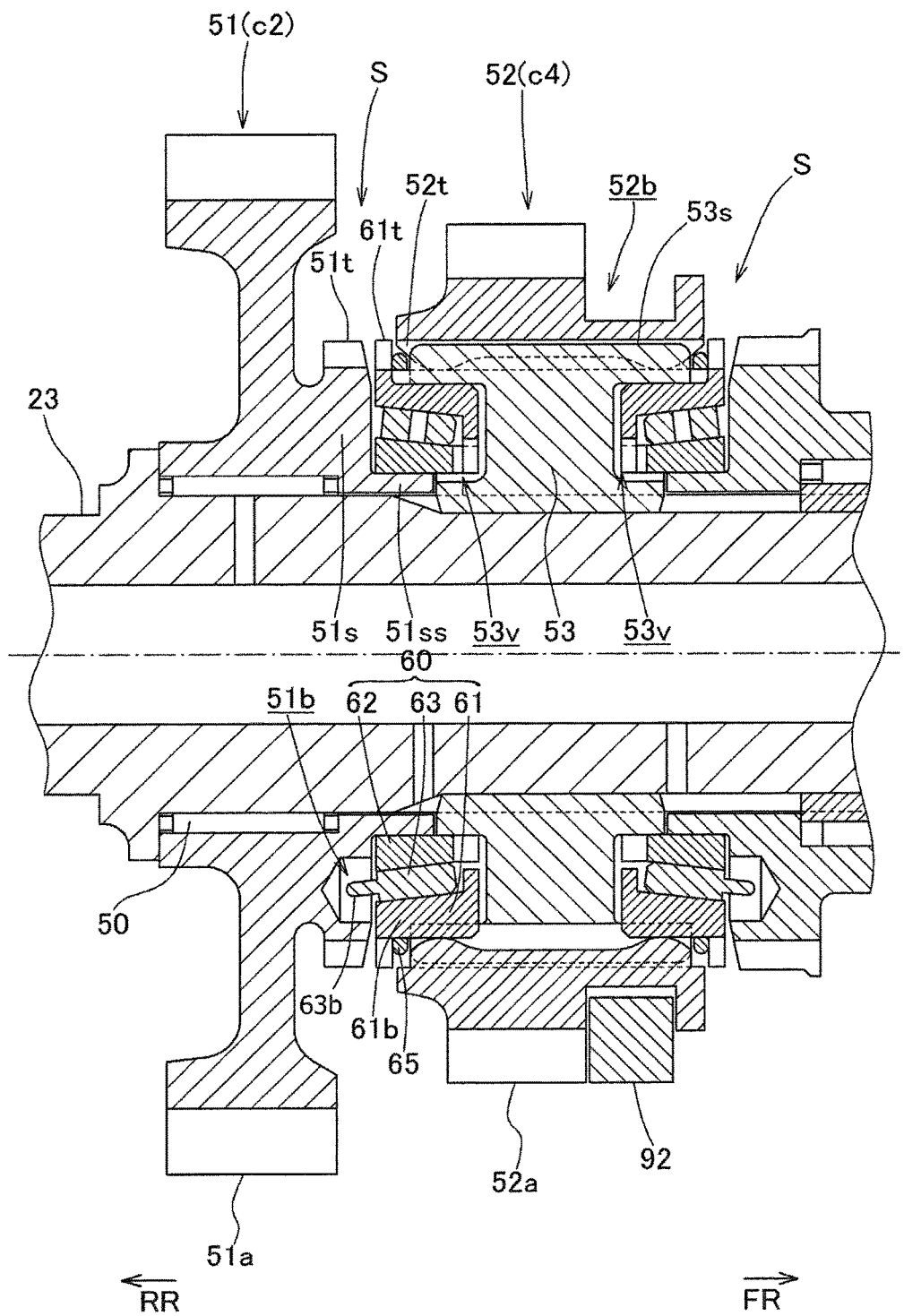
FIG. 3 is a partially enlarged sectional view of FIG. 2.

FIG. 3 is a sectional view illustrating a partially enlarged sectional view of the gear transmission mechanism shown in FIG. 2. FIG. 4 illustrates an enlarged sectional view obtained by further enlarging essential parts of FIG. 3 together with a partial sectional view obtained by circumferentially cutting and developing the essential parts.

As illustrated in FIG. 3, a transmission gear 51 typified by the second speed driven transmission gear c2 is pivotally supported on the rotating shaft (counter shaft) 23 via a needle bearing 50.

The transmission gear 51 has a gear tooth 51a (second speed driven transmission gear tooth) on its outer circumference. Further, gear dog teeth 51t are formed on an outer circumference of a cylindrical portion 51s that diminishes in diameter and protrudes on the side of the fourth speed driven transmission gear c4.

Still further, a protruding cylindrical portion 51ss is formed so as to have its inner circumferential portion further protruding from the cylindrical portion 51s having the gear dog teeth 51t on its outer circumference.

On the other hand, the fourth speed driven transmission gear c4, a shifter gear, corresponds to a synchronizer sleeve 52 and is spline-fitted to an outer circumferential surface of a hub 53 that is spline-fitted to the counter shaft 23 in such a manner so as to be restricted in axial motion, thus causing the fourth speed driven transmission gear c4 to be fitted onto the counter shaft 23 in a freely axially slidable manner.

Spline teeth 53s formed on the outer circumferential surface of the hub 53 engage with sleeve teeth 52t formed on an inner circumferential surface of the synchronizer sleeve 52.

It should be noted that the many spline teeth 53s formed on the outer circumferential surface of the hub 53 have circumferentially chipped areas at intervals of 120 degrees, thus forming three cutout grooves 53b.

Two ends of the sleeve tooth 52 arranged annularly on the inner circumferential surface of the synchronizer sleeve 52 are tapered.

The synchronizer sleeve 52 has a shifter gear tooth 52a (fourth speed driven transmission gear tooth) on its outer circumference. Further, the fork engagement groove 52b is formed on the synchronizer sleeve 52 for engagement with the shift fork 92.

The hub 53 that supports the synchronizer sleeve 52 has annular recessed portions 53v formed between its base portion that is fitted to the counter shaft 23 and its outer circumferential portion on which the spline teeth 53s are formed. The annular recessed portions 53v are formed one on the front side and the other on the rear side of the hub 53.

The protruding cylindrical portion 51ss of the transmission gear 51 is in contact with the base portion of the hub 53. An end surface of the cylindrical portion 51s having the gear dog teeth 51t of the transmission gear 51 on its outer circumference faces an opening of one of the annular recessed portions 53v of the hub 53.

A blocking ring 60 is interposed in an annular space formed as a result of the end surface of the cylindrical portion 51s facing the opening of the annular recessed portion 53v of the hub 53.

The blocking ring 60 includes annular outer and inner rings 61 and 62, and a taper cone 63. The outer and inner rings 61 and 62, respectively on the outside and on the inside, are arranged to coaxially overlap each other. The taper cone 63 is interposed between the outer and inner rings 61 and 62.

Outer and inner circumferential surfaces of the taper cone 63 are both formed into taper surfaces and in surface contact with an inner circumferential taper surface of the outer ring 61 and an outer circumferential taper surface of the inner ring 62, respectively.

The outer ring 61 corresponds to a synchronizer ring. A plurality of ring teeth 61t in the shape of dog teeth are formed circumferentially on an outer circumferential surface of the outer ring 61.

Further, projecting portions 61b are formed on the outer circumferential surface of the outer ring 61 at intervals of 120 degrees. The three projecting portions 61b engage with the three respective cutout grooves 53b of the hub 53.

Figure 4:
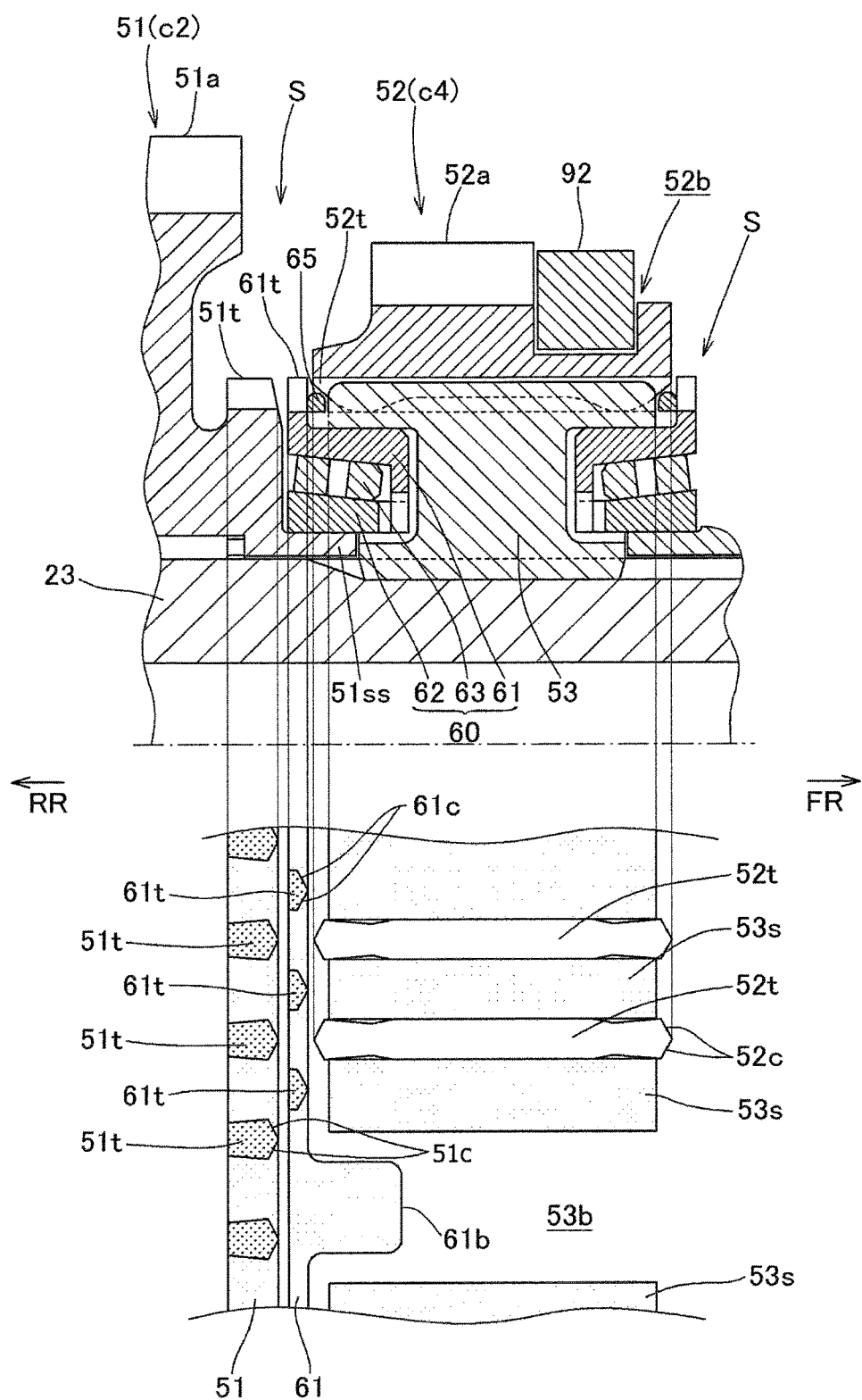
FIG. 4 is an explanatory diagram showing an enlarged sectional view of essential parts shown in FIG. 2 together with a partial sectional view obtained by circumferentially cutting and developing the essential parts.

The circumferential width of each of the projecting portions 61b of the outer ring 61 is smaller than that of each of the cutout grooves 53b of the hub 53, thus restricting the rotation of the outer ring 61 relative to the hub 53 to a predetermined rotation range (refer to FIG. 4).

A synchronizer spring 65 is arranged between the outer ring 61 and the spline teeth 53s of the hub 53. The synchronizer spring 65 is supported from inside by the projecting portion 61b of the outer ring 61 (refer to FIG. 3).

Referring to FIG. 3, a projecting portion 63b is formed on a rear end portion of the taper cone 63. The projecting portion 63b protrudes on the side of the transmission gear 51 (rear side). The projecting portion 63b is fitted to a recessed portion 51b formed in the cylindrical portion 51s having the gear dog teeth 51t of the transmission gear 51 on its outer circumference, rotating the taper cone 63 integrally with the transmission gear 51.

As illustrated in FIG. 4, the sleeve teeth 52t of the synchronizer sleeve 52, the ring teeth 61t of the outer ring 61, and the gear dog teeth 51t of the transmission gear 51 are located along the same radius from the center axis of the rotating shaft (counter shaft) 23. The sleeve tooth 52t, the ring tooth 61t, and the gear dog tooth 51 are arranged longitudinally in this order, with the synchronizer spring 65 located between the sleeve tooth 52t and the ring tooth 61t.

Each of the sleeve teeth 52t is formed tapered at both ends thereof in the longitudinal direction by a pair of chamfered surfaces 52c, with the chamfered surfaces 52c intersecting each other at an obtuse angle.

An end portion of each of the ring teeth 61t on the side of the sleeve teeth 52t is formed tapered by similar chamfered surfaces 61c.

Similarly, an end portion of each of the gear dog teeth 51t on the side of the sleeve teeth 52t is formed tapered by similar chamfered surfaces 51c.

The synchronizer mechanism S is configured as described above.

The synchronizing actions of the synchronizer mechanism S will be described with reference to FIGS. 4 to 6.

The condition shown in FIG. 4 is a neutral condition prior to initiating gear shifting in which the synchronizer sleeve 52 is at a neutral position, with the sleeve teeth 52t not in contact with the preceding and succeeding synchronizer springs 65.

The outer and inner rings 61 and 62 rotate integrally with the hub 53. On the other hand, the taper cone 63 rotates integrally with the transmission gear 51. The taper cone 63 can rotate relative to the outer and inner rings 61 and 62 and does not act in synchronization with the outer and inner rings 61 and 62.

Figure 5:
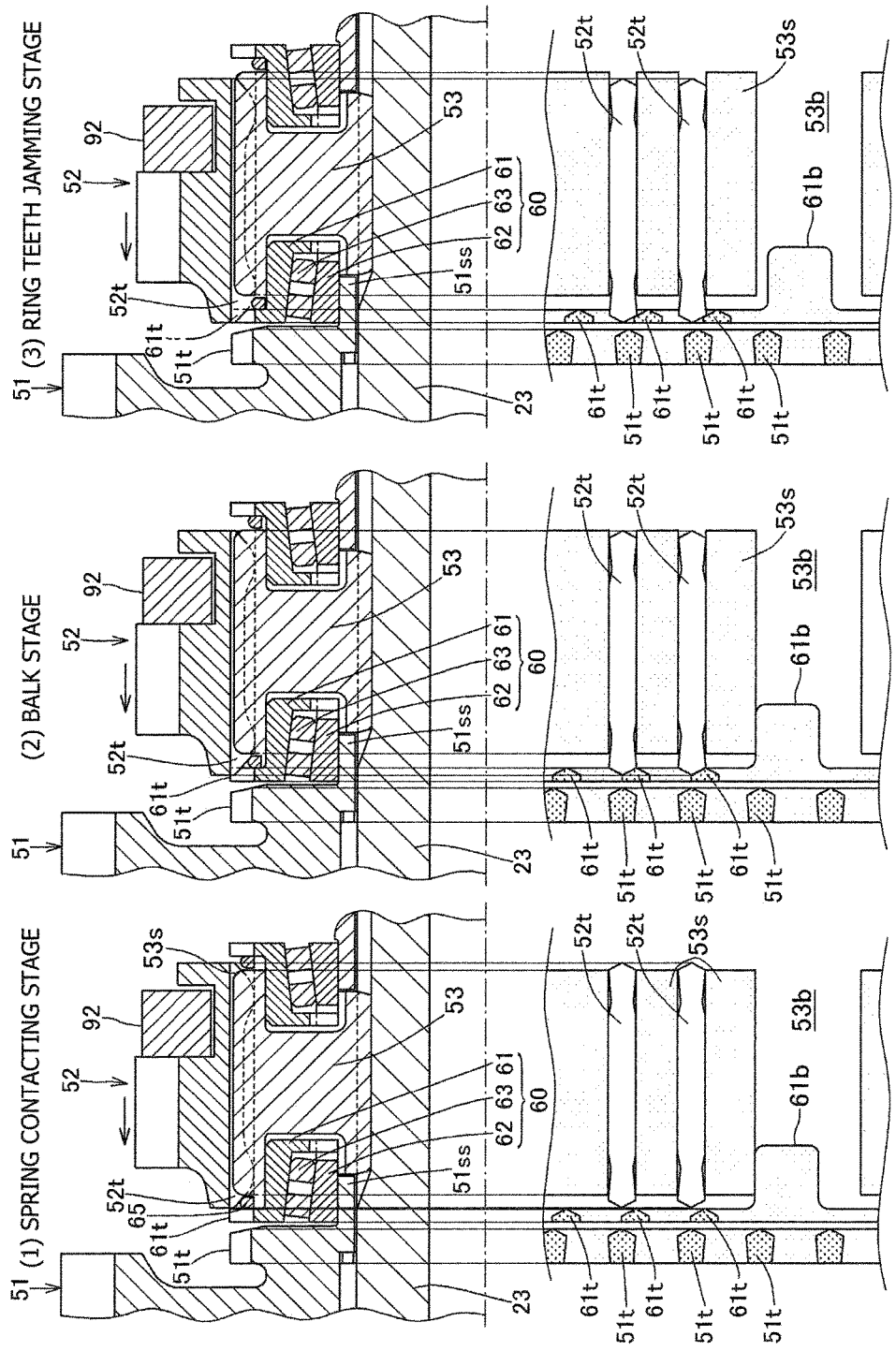
FIG. 5 are explanatory diagrams sequentially showing first-half synchronizing actions of a synchronizer mechanism during gear shifting.

When the synchronizer sleeve 52 moves rearwardly after gear shifting begins, the sleeve teeth 52t of the synchronizer sleeve 52 come into contact with the synchronizer spring 65, thus causing the blocking ring 60 to be pressed toward the transmission gear 51 via the synchronizer spring 65 as illustrated in FIG. 5(1).

When the synchronizer sleeve 52 moves further rearwardly, the blocking ring 60 is pressed toward the transmission gear 51, producing frictional force between the respective tapered surfaces of the outer ring 61 and the taper cone 63 and between those of the taper cone 63 and the inner ring 62 as illustrated in FIG. 5(2) and rotating the outer ring 61. At the same time, frictional force is also produced between the inner ring 62 and the protruding cylindrical portion 51ss of the transmission gear 51. On the other hand, tips of the sleeve teeth 52t come into contact with those of the ring teeth 61t. Further, the chamfered surfaces 52c and 61c thereof come into contact with each other, thus initiating synchronization (balk stage).

When the synchronizer sleeve 52 moves still further rearwardly, the sleeve teeth 52t jam between the ring teeth 61*t* for meshing, thus rotating the synchronizer sleeve 52 integrally with the outer ring 61 as illustrated in FIG. 5(3) (ring teeth jamming stage).

Figure 6:
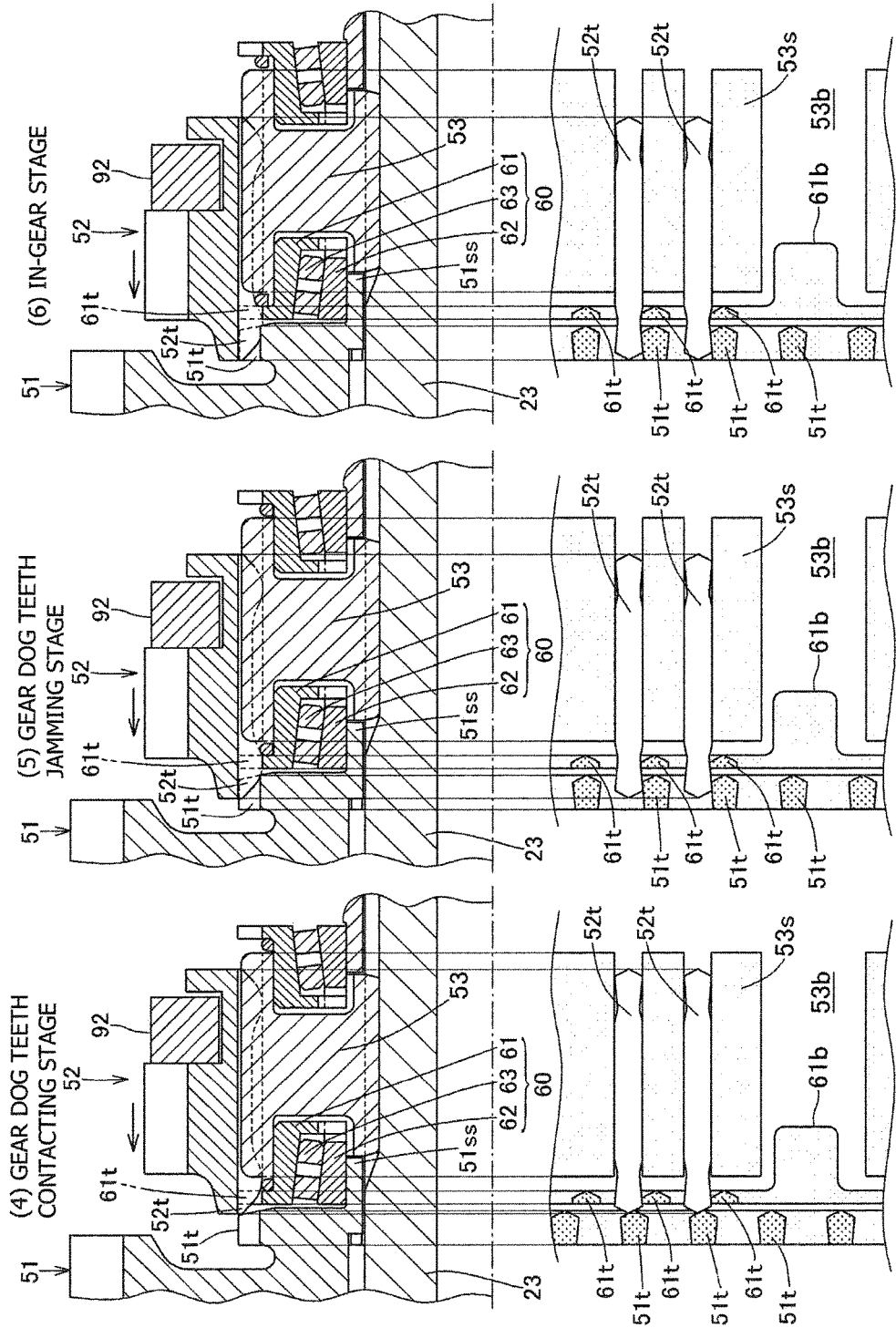
FIG. 6 are explanatory diagrams sequentially showing second-half synchronizing actions of the synchronizer mechanism during gear shifting.

When the synchronizer sleeve 52 moves still further rearwardly, tips of the sleeve teeth 52*t* come into contact with those of the gear dog teeth 51*t* of the transmission gear 51, and moreover, the chamfered surfaces 52*c* and 51*c* of the respective teeth come into contact with each other as illustrated in FIG. 6(4) (gear dog teeth contacting stage).

When the synchronizer sleeve 52 moves still further rearwardly, the sleeve teeth 52*t* jam between the gear dog teeth 51*t* for meshing as illustrated in FIG. 6(5), thus terminating synchronization (gear dog teeth jamming stage).

The synchronizer sleeve 52 moves still further rearwardly, thus causing the sleeve teeth 52*t* to mesh completely with the gear dog teeth 51*t* as illustrated in FIG. 6(6). As a result, the synchronizer sleeve 52 (and the rotating shaft 23) rotate integrally with the transmission gear 51 (in-gear stage).

The synchronizer mechanism S couples the synchronizer sleeve 52 and the transmission gear 51 while at the same time synchronizing them as described above.

A description will be given next of the transmission drive mechanism 70 that moves the synchronizer sleeve 52 with reference to FIGS. 7 and 8.

Figure 7:
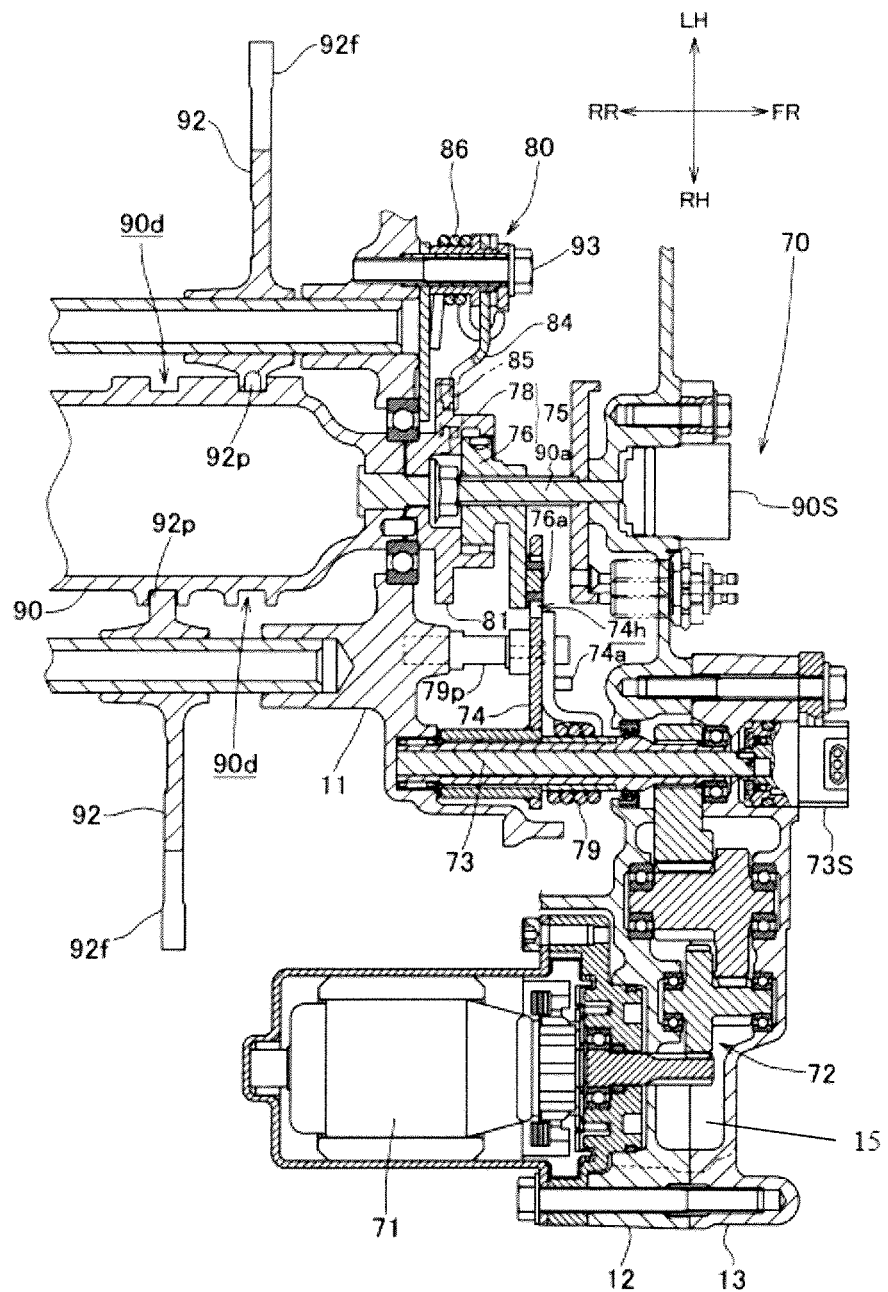
FIG. 7 is a sectional view of a transmission drive mechanism taken along line VII-VII shown in FIG. 1.

FIG. 7 is a sectional view of the transmission drive mechanism 70 taken along line VII-VII shown in FIG. 1.

As illustrated in FIG. 7, the rotational power of the shift motor 71 of the transmission drive mechanism 70 is decelerated via the reduction gear mechanism 72 and transferred to rotate a shift spindle 73.

A base end portion of a master arm 74 is fitted to the shift spindle 73. The master arm 74 swings as a result of rotation of the shift spindle 73.

A pin 79*p* that penetrates a restricting hole 74*b* formed in the master arm 74 projects on the transmission holder 11. A torsion coil spring 79 is supported by winding its coil section around the shift spindle 73. The torsion coil spring 79 is mounted in such a manner so that both end portions thereof that extend in the same direction sandwich a locking piece 74*a* formed on the master arm 74 and the pin 79*p* from both outsides.

Therefore, when the master arm 74 swings, a biasing force acts in such a manner as to bring the master arm 74 back to its neutral position because of the torsion spring force of the torsion coil spring 79.

The swinging of the master arm 74 rotates the shift drum 90 via a pawl ratchet mechanism 75.

Figure 8:
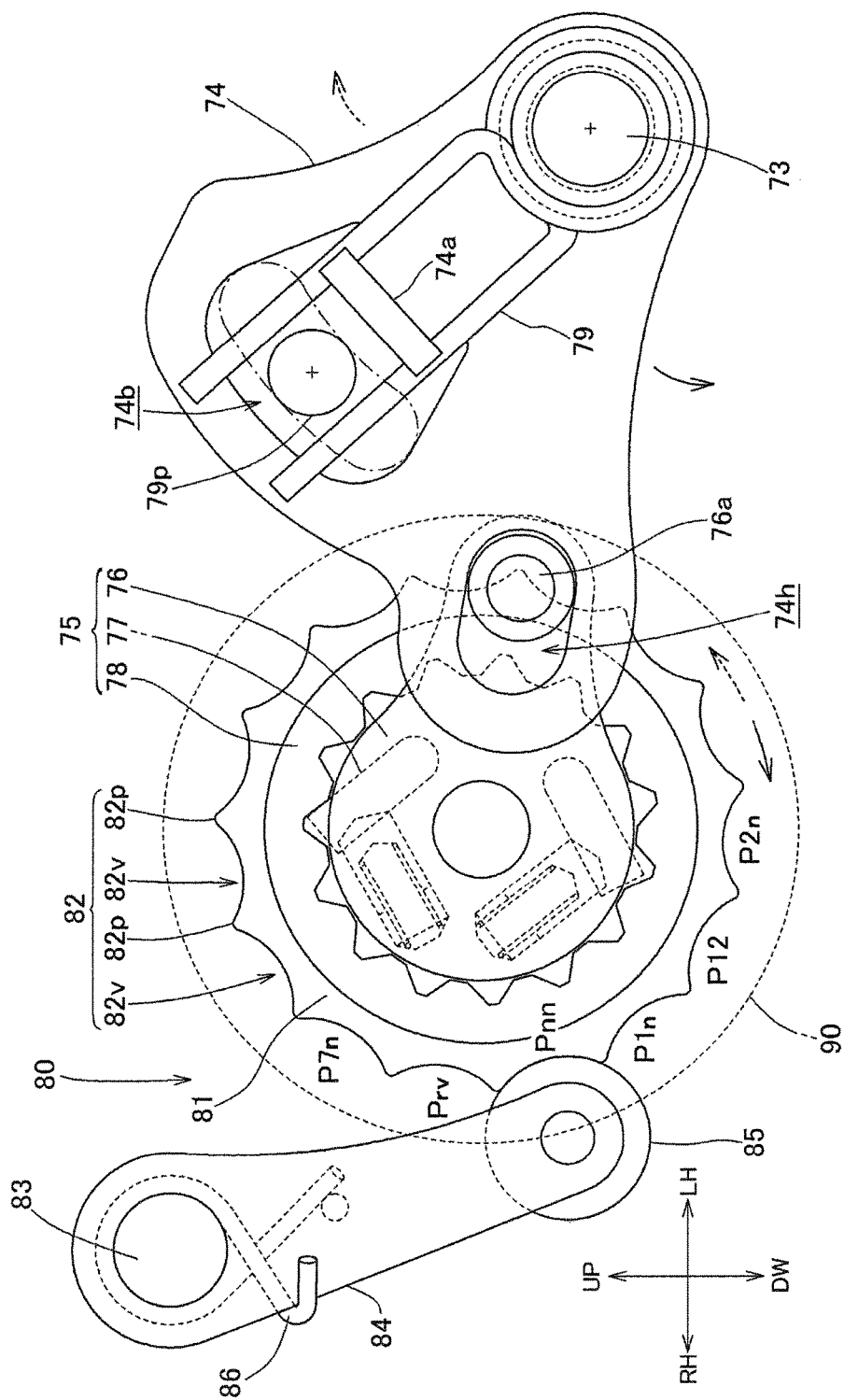
FIG. 8 is an enlarged sectional view showing essential parts of the transmission drive mechanism in a partially simplified manner.

As illustrated in FIG. 8, the pawl ratchet mechanism 75 includes a ratchet input member 76, a ratchet output member 78, and a pair of pawls 77. A protrusion 76*a* is formed on the ratchet input member 76. The protrusion 76*a* is fitted in a freely slidable manner into a long hole 74*h* formed in a swinging tip portion of the master arm 74. The ratchet output member 78 rotates integrally with the shift drum 90. The pawls 77 are incorporated between the outer circumference of the ratchet input member 76 and the inner circumference of the ratchet output member 78.

When the ratchet input member 76 rotates in one direction by being guided by the protrusion 76*a* that slides inside the long hole 74*h* as a result of rotation of the master arm 74, the tip of one of the pawls 77 stands up and is locked to a locking protrusion of the inner circumference of the ratchet output member 78. This intermittently rotates the ratchet output member 78 in step with the rotation of the ratchet input member 76, intermittently rotating the shift drum 90 and achieving gear shifting.

A detent mechanism 80 is provided to guide the shift drum 90 to a predetermined rotation position for positioning so as to intermittently rotate the shift drum 90.

A star cam 81 is formed on an outer circumference portion of the ratchet output member 78 that rotates integrally with the shift drum 90.

As illustrated in FIG. 8, an uneven cam surface 82 is formed on an outer circumferential end surface of the star cam 81. Curved detent recessed portions 82*v*, associated with gear positions, and tapered and pointed projecting portions 82*p* are circumferentially and sequentially formed on the uneven cam surface 82 in such a manner as to alternate continuously.

Referring to FIG. 8, a roller 85 is pivotally supported in a freely rotatable manner at the tip of a detent arm 84 that is pivotally supported on a support shaft 83 in a freely swingable manner.

The detent arm 84 is biased by a torsion coil spring 86 to swing, pressing the roller 85 onto the uneven cam surface 82 of the star cam 81.

The detent mechanism 80 is configured as described above. The roller 85 pressed onto the uneven cam surface 82 of the star cam 81 slips into a required detent recessed portion 82*v*, thus positioning the star cam 81 and the shift drum 90 at a required rotation position.

The detent mechanism 80 is simple in structure so that the roller 85, pivotally supported at the tip of the detent arm 84 that is biased by the torsion coil spring 86, comes into contact with and presses the uneven cam surface 82 of the star cam 81. This allows the detent mechanism 80 to be compactly incorporated into the transmission 20 for downsizing and weight reduction of the transmission 20.

It should be noted that the shift drum 90 has not only rotation positions for the respective seven speed gear positions and a rotation position for the reverse gear position but also reserve rotation positions, each between the respective speed gear positions. The shift drum 90 has 15 rotation positions including a reverse rotation position Pry, a neutral rotation position Pnn, a first speed rotation position Pin, a first-second speed reserve rotation position P12, a second speed rotation position Pn2, and so on in this order. The 15 detent recessed portions 82*v*, each associated with one of the rotation positions, are formed on the uneven cam surface 82 of the star cam 81 (refer to FIG. 8).

Four lead grooves 90*d* are formed side by side on an outer circumferential surface of the shift drum 90 in the direction of width. The lead grooves 90*d* extend circumferentially while being offset in the direction of width.

As described earlier, the shift fork shafts 91 are arranged, one on the left and the other on the right of the shift drum 90, and the two shift forks 92 are pivotally supported on each of the shift fork shafts 91 in an axially slidable manner. Each of the shift forks 92 has a pin portion 92*p* slidably fitted to the lead groove 90*d* of the shift drum 90 and a fork tip portion 92*f* engaging with the fork engagement groove 52*b* of the shifter gear of the gear transmission mechanism 21. The fork tip portion 92*f* is bifurcated.

Therefore, when the shift drum 90 is driven to rotate by the shift motor 71 of the transmission drive mechanism 70, the associated shift fork 92 is guided to move axially by each of the lead grooves 90*d* formed on the outer circumferential surface of the shift drum 90, thus moving each shifter gear axially and achieving gear shifting.

It should be noted that, referring to the sectional view of the transmission drive mechanism 70 illustrated in FIG. 7, a shift spindle rotation position detection sensor 73S is provided on an end portion of the shift spindle 73 to detect a rotation position (rotation angle) θ of the shift spindle 73.

Further, a shift drum rotation position detection sensor 90S is provided on an end portion of an extension shaft 90a to detect a rotation position of the shift drum 90. The extension shaft 90a extends forward on a central axis of rotation from a front end of the shift drum 90.

For example, when the gear is shifted up from the first to second speed, the shift drum 90 is rotated in advance from the first speed rotation position P1n to the first-second speed reserve rotation position P12, moving the fourth speed driven transmission gear c4 (synchronizer sleeve 52), a shifter gear, rearwardly via the shift fork 92 and coupling the fourth speed driven transmission gear c4 to the driven transmission gear c2.

At this time, the synchronizer sleeve 52 is coupled to the driven transmission gear c2 by the synchronizer mechanism S while being synchronized with the driven transmission gear c2. This process is illustrated in FIGS. 5 and 6.

More specifically, the example of the synchronizing actions of the synchronizer mechanism S in FIGS. 5 and 6 shows each of the steps of moving and coupling the fourth speed driven transmission gear c4 (synchronizer sleeve 52) to the driven transmission gear c2 (transmission gear 51) while synchronizing these gears. These actions are synchronizing actions performed when the shift drum 90 is rotated from the first speed rotation position P1n to the first-second speed reserve rotation position P12.

During this period, the star cam 81 rotates integrally with the shift drum 90. As a result of the rotation of the star cam 81, the roller 85 pressing the uneven cam surface 82 of the star cam 81 moves from the detent recessed portion 82v associated with the pre-gear-shifting first speed rotation position P1n of the uneven cam surface 82 of the star cam 81, climbing over the projecting portion 82p and reaching the detent recessed portion 82v associated with the post-gear-shifting first-second speed reserve rotation position P12 (refer to FIGS. 9 and 10).

During gear shifting, therefore, a rotational force, transferred from the driving power of the shift motor 71 via the reduction gear mechanism 72, the shift spindle 73, the master arm 74, and the pawl ratchet mechanism 75, acts on the shift drum 90. At the same time, another rotational force acts on the shift drum 90. This rotational force is produced by the roller 85 that is biased by the torsion coil spring 86 of the detent mechanism 80, pressing the uneven cam surface 82 of the star cam 81 that rotates integrally with the shift drum 90.

In the process of synchronization of the synchronizer sleeve 52 with and coupling thereof to the driven transmission gear c2 by the synchronizer mechanism S, a first synchronization position X1 denotes a movement position of the synchronizer sleeve 52 when the balk stage (refer to FIG. 5(2)) begins in which the sleeve teeth 52t of the synchronizer sleeve 52 come into contact with the ring teeth 61t as a result of the movement of the synchronizer sleeve 52, i.e., when the synchronization begins in which the tips of the sleeve teeth 52t and those of the ring teeth 61t come into contact with each other.

Figure 9:
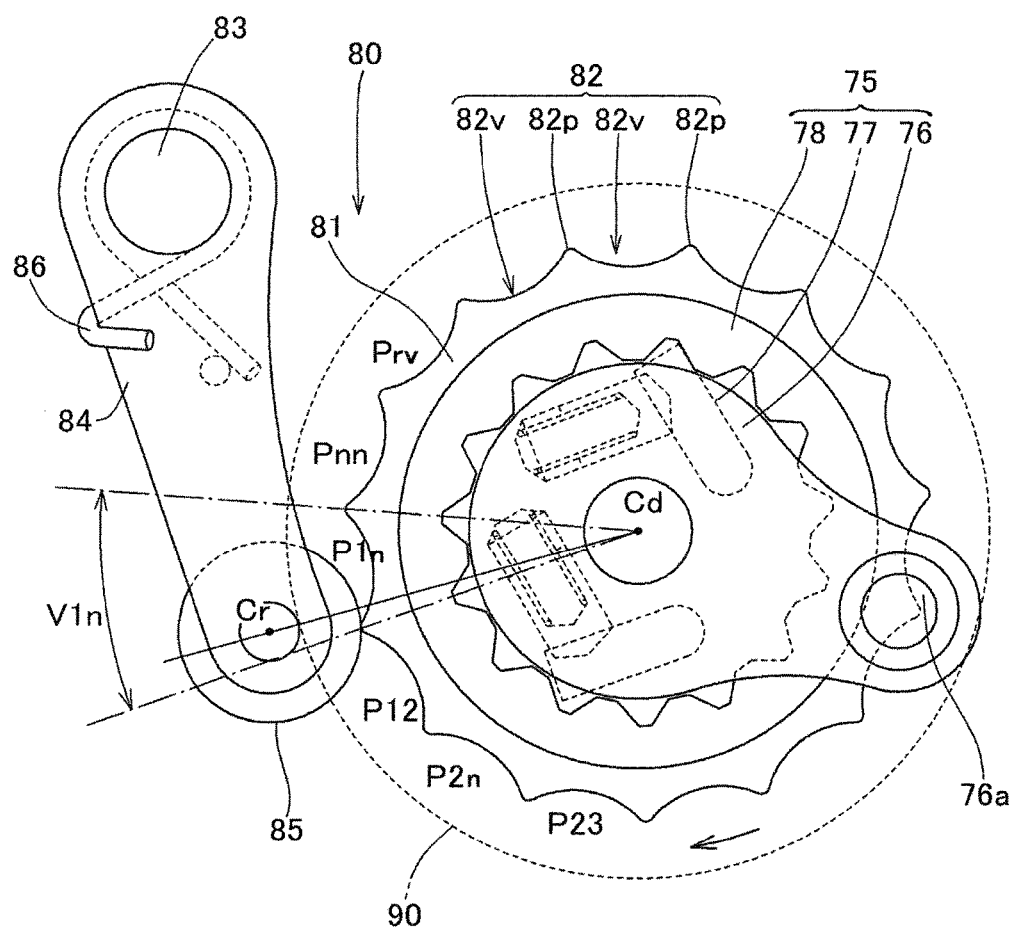
FIG. 9 is a diagram illustrating a detent mechanism when a synchronizer sleeve is at a first synchronization position.

The star cam 81 is set up to be located at the rotation position shown in FIG. 9 when the synchronizer sleeve 52 is at the first synchronization position X1.

More specifically, when the movement position of the synchronizer sleeve 52 is at the first synchronization position X1 where the tips of the sleeve teeth 52t and those of the ring teeth 61t come into contact with each other, the roller 85 is set up to be in contact with the detent recessed portion 82v associated with the pre-gear-shifting first speed rotation position Pin of the star cam 81 as illustrated in FIG. 9.

A central axis Cr of the roller 85 lies within a range of angles V1n facing the detent recessed portion 82v associated with the first speed rotation position P1n from a central axis Cd of the shift drum 90 and the star cam 81. Further, the central axis Cr is located at a position of the detent recessed portion 82v near the detent recessed portion 82v associated with the post-gear-shifting first-second speed reserve rotation position P12.

Therefore, the roller 85 pivotally supported at the tip of the detent arm 84 that is biased to swing by the torsion coil spring 86 of the detent mechanism 80 presses a sloped surface of the detent recessed portion 82v associated with the pre-gear-shifting first speed rotation position P1n on the side of the detent recessed portion 82v associated with the post-gear-shifting first-second speed reserve rotation position P12. As a result, the biasing force of the torsion coil spring 86 acts on the star cam 81 in the rotation direction of bringing the star cam 81 back to the pre-gear-shifting first speed rotation position P1n.

If the shift motor 71 stops driving for some reason when the synchronizer sleeve 52 is at the first synchronization position X1, there is almost no frictional resistance for the synchronizer sleeve 52 to return in the direction before the sleeve teeth 52t came into contact with the ring teeth 61t as illustrated in FIG. 5(2). In the absence of the driving power of the shift motor 71, the biasing force of the torsion coil spring 86 acts on the star cam 81 in the direction of bringing the star cam 81 back to the pre-gear-shifting first speed rotation position P1n, allowing the star cam 81 to return with ease to the pre-gear-shifting first speed rotation position P1n together with the shift drum 90.

When the synchronizer sleeve 52 is at the first synchronization position X1, the tips of the sleeve teeth 52t and those of the ring teeth 61t are in contact with each other. If the synchronizer sleeve 52 stops moving in this condition, the tips of the sleeve teeth 52t and those of the ring teeth 61t continuously butt each other, which is not preferred. However, the roller 85 is set up to be in contact with the pre-gear-shifting detent recessed portion 82v of the star cam 81 as described above when the synchronizer sleeve 52 is at the first synchronization position X1. The star cam 81 is brought back to the pre-gear-shifting first speed rotation position P1n together with the shift drum 90 by the biasing force of the torsion coil spring 86, and the synchronizer sleeve 52 of the synchronizer mechanism S is also moved to its original proper position. This moves the tips of the sleeve teeth 52t and those of the ring teeth 61t away from continuously butting each other, thus avoiding continuous butting between the tips of the sleeve teeth 52t and those of the ring teeth 61t.

In the process of synchronization of the synchronizer sleeve 52 with and coupling thereof to the driven transmission gear c2 by the synchronizer mechanism S, a second synchronization position X2 denotes a movement position of the synchronizer sleeve 52 when the gear dog teeth contacting stage (refer to FIG. 6(4)) begins in which the sleeve teeth 52t of the synchronizer sleeve 52 come into contact with the gear dog teeth 51t of the transmission gear 51 after having come into contact and meshed with the ring teeth 61t as a result of the movement of the synchronizer sleeve 52, i.e., when the tips of the sleeve teeth 52t and those of the gear dog teeth 51t come into contact with each other.

Figure 10:
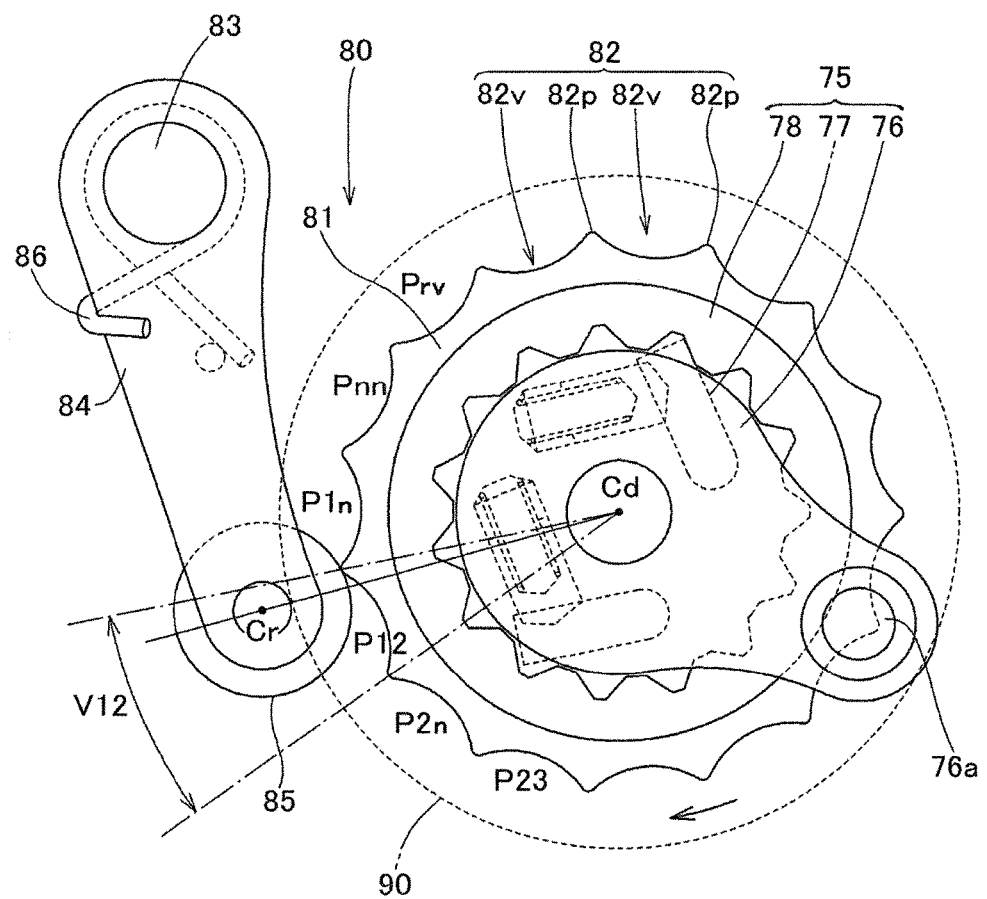
FIG. 10 is a diagram illustrating the detent mechanism when the synchronizer sleeve is at a second synchronization position.

The star cam 81 is set up to be located at the rotation position shown in FIG. 10 when the synchronizer sleeve 52 is at the second synchronization position X2.

More specifically, when the movement position of the synchronizer sleeve 52 is at the second synchronization position X2 where the tips of the sleeve teeth 52t and those of the gear dog teeth 51t come into contact with each other, the roller 85 is set up to be in contact with the detent recessed portion 82v associated with the post-gear-shifting first-second speed reserve rotation position P12 of the star cam 81 as illustrated in FIG. 10.

The central axis Cr of the roller 85 lies within a range of angles V12 facing the detent recessed portion 82v associated with the first-second speed reserve rotation position P12 from the central axis Cd of the shift drum 90 and the star cam 81. Further, the central axis Cr is located at a position of the detent recessed portion 82v near the detent recessed portion 82v associated with the pre-gear-shifting first speed rotation position P1n.

Therefore, the roller 85 pivotally supported at the tip of the detent arm 84 that is biased to swing by the torsion coil spring 86 of the detent mechanism 80 presses the sloped surface of the detent recessed portion 82v associated with the post-gear-shifting first-second speed reserve rotation position P12 on the side of the detent recessed portion 82v associated with the pre-gear-shifting first speed rotation position P1n. As a result, the biasing force of the torsion coil spring 86 acts on the star cam 81 in the rotation direction of accelerating gear shifting.

If the shift motor 71 stops driving for some reason when the synchronizer sleeve 52 is at the second synchronization position X2, the biasing force of the torsion coil spring 86 acts on the synchronizer sleeve 52 in the direction of accelerating gear shifting (leftward in FIG. 6(4)). Therefore, even if the sleeve teeth 52t of the synchronizer sleeve 52 are in contact with the gear dog teeth 51t, but when the tips thereof are about to butt each other, the torsion coil spring 86 can bias the synchronizer sleeve 52 in the direction of moving the tips of the sleeve teeth 52t and those of the gear dog teeth 51t away from butting each other.

Further, the synchronizer sleeve 52 is receiving a biasing force in the direction of accelerating gear shifting. Therefore, if the timing is favorable, each of the sleeve teeth 52t can jam between the adjacent gear dog teeth 51t, thus avoiding butting between the tips of the sleeve teeth 52t and those of the gear dog teeth 51t.

Although a description has been given of a case in which the gear is shifted up from the first to second speed, as an example, the present invention is applicable to shifting of the gear to other speeds.

Further, the present invention is applicable not only to shifting up to a higher gear but also shifting down to a lower gear.

It should be noted that although a synchronizer-mechanism-equipped transmission according to the embodiment of the present invention has been described, modes of the present invention are not limited to the above embodiment and may include modes that are carried out in various ways without departing from the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A synchronizer-mechanism-equipped transmission comprising:
   a gear transmission mechanism having a plurality of driving transmission gears supported on a main shaft and a plurality of driven transmission gears supported on a counter shaft, the driving transmission gears and the driven transmission gears constantly meshing with each other for each gear ratio;
   a first transmission gear that is supported on at least one of the main shaft and the counter shaft, each being a rotating shaft;
   gear dog teeth on the first transmission gear;
   a synchronizer ring having ring teeth;
   a hub on the rotating shaft, the hub having teeth extending in an axial direction of the rotating shaft;
   a synchronizer sleeve supported on the hub, the synchronizer sleeve having teeth extending in the axial direction of the rotating shaft and mating with the teeth of the hub, the synchronizer sleeve movable in the axial direction relative to the hub,
   wherein the synchronizer sleeve moves and causes the sleeve teeth to come into contact and mesh with the ring teeth first and then come into contact and mesh with the gear dog teeth so that the synchronizer sleeve and the first transmission gear are synchronized and coupled together; and
   a transmission drive mechanism including:
     a shift spindle;
     a master arm connected to the shift spindle and rotated by the shift spindle;
     a shift drum driven to rotate by an actuator;
     a shift fork guided by a lead groove of the shift drum to move axially as a result of rotation of the shift drum, the shift fork engaging with the synchronizer sleeve so as to move the synchronizer sleeve;
     an input arm having a protrusion extending through a hole in the master arm;
     an output arm directly connected to the shift drum;
     a plurality of detents in an inner circumferential surface of the output arm;
     a pawl to selectively couple the input arm to the output arm to cause the output arm to rotate with the input arm;
     a star cam having an uneven cam surface formed on an outer circumferential surface of the output arm, detent recessed portions associated with gear positions and projecting portions being formed on the uneven cam surface in such a manner so as to alternate continuously, wherein a number of detent recess portions on the outer circumferential surface of the output arm is equal to a number of the plurality of detents in the inner circumferential surface of the output arm;
     a detent arm having a pressing member engaging the uneven cam surface; and
     a spring causing the pressing member to come into contact with and press the uneven cam surface of the star cam and causing the pressing member to slip into a detent recessed portion, the shift drum being rotated and biased together with the uneven cam surface so as to be positioned,
   wherein, when the sleeve teeth of the synchronizer sleeve are located at a first synchronization position where the sleeve teeth begin to come into contact with the ring teeth, the pressing member has its center axis within an angular range from a center axis of the shift drum and the star cam, the angular range covering a detent recessed portion of a pre-gear-shifting position, the center axis of the pressing member being positioned at an angular position nearer to a next gear-shifting position than an angularly intermediate position of the detent recessed portion of the pre-gear-shifting position.

2. The synchronizer-mechanism-equipped transmission of claim 1, wherein when the sleeve teeth of the synchronizer sleeve that move during gear shifting are located at a second synchronization position where the sleeve teeth begin to come into contact with the gear dog teeth, the pressing member is in contact with a post-gear-shifting detent recessed portion of the star cam.

3. The synchronizer-mechanism-equipped transmission of claim 2, wherein the pressing member is a roller, pivotally supported at a tip of the detent arm that is biased by the spring for coming into contact with and presses the uneven cam surface of the star cam.

4. The synchronizer-mechanism-equipped transmission of claim 1, wherein the pressing member is a roller, pivotally supported at a tip of the detent arm that is biased by the spring for coming into contact with and presses the uneven cam surface of the star cam.

5. The synchronizer-mechanism-equipped transmission of claim 1, wherein the sleeve teeth are tapered at both ends thereof in a longitudinal direction by a pair of chamfered surfaces, and
wherein the chamfered surfaces intersect each other at an obtuse angle.

6. The synchronizer-mechanism-equipped transmission of claim 5, wherein an end portion of each of the ring teeth on a side of the sleeve teeth is formed by chamfered surfaces.

7. The synchronizer-mechanism-equipped transmission of claim 5, wherein an end portion of each of the gear dog teeth on a side of the sleeve teeth is formed by chamfered surfaces.

8. A synchronizer-mechanism-equipped transmission comprising:
a gear transmission mechanism having a plurality of driving transmission gears supported on a main shaft and a plurality of driven transmission gears supported on a counter shaft;
a first transmission gear that is supported on at least one of the main shaft and the counter shaft, each being a rotating shaft;
gear dog teeth on the first transmission gear;
a blocking ring having ring teeth, the blocking ring comprising a first ring and a second ring spaced radially outwardly from the first ring and a taper cone between the first ring and the second ring;
a synchronizer sleeve supported on the rotating shaft and axially movable,
wherein said synchronizer sleeve moves and causes sleeve teeth to come into contact and mesh with the ring teeth first and then come into contact and mesh with the gear dog teeth so that the synchronizer sleeve and the first transmission gear are synchronized and coupled together during gear shifting; and
a transmission drive mechanism including:
a shift spindle;
a master arm connected to the shift spindle and rotated by the shift spindle;
a shift drum driven to rotate by an actuator;
a shift fork guided by a lead groove of the shift drum to move axially as a result of rotation of the shift drum, the shift fork engaging with the synchronizer sleeve so as to move the synchronizer sleeve;
an input arm having a protrusion extending through a hole in the master arm;
an output arm directly connected to the shift drum;
a plurality of detents in an inner circumferential surface of the output arm;
a pawl engaging the detents to couple the input arm to the output arm to cause the output arm to rotate with the input arm;
a star cam on an outer circumferential end surface of the output arm, the star cam having an uneven cam surface comprising detent recessed portions associated with gear positions and projecting portions, wherein a number of detent recess portions on the outer circumferential surface of the output arm is equal to a number of the plurality of detents in the inner circumferential surface of the output arm;
a detent arm having a pressing member engaging the uneven cam surface; and
a spring causing the pressing member to come into contact with and press the uneven cam surface of the star cam and causing the pressing member to slip into a detent recessed portion,
wherein, when the sleeve teeth of the synchronizer sleeve are located at a first synchronization position where the sleeve teeth begin to come into contact with the ring teeth, the pressing member has its center axis within an angular range from a center axis of the shift drum and the star cam, the angular range covering a detent recessed portion of a pre-gear-shifting position, the center axis of the pressing member being positioned at an angular position nearer to a next gear-shifting position than an angularly intermediate position of the detent recessed portion of the pre-gear-shifting position.

9. The synchronizer-mechanism-equipped transmission of claim 8, wherein when the sleeve teeth of the synchronizer sleeve that move during gear shifting are located at a second synchronization position where the sleeve teeth begin to come into contact with the gear dog teeth, the pressing member is in contact with a post-gear-shifting detent recessed portion of the star cam.

10. The synchronizer-mechanism-equipped transmission of claim 9, wherein the pressing member is a roller, pivotally supported at a tip of the detent arm that is biased by the spring for coming into contact with and presses the uneven cam surface of the star cam.

11. The synchronizer-mechanism-equipped transmission of claim 8, wherein the pressing member is a roller, pivotally supported at a tip of the detent arm that is biased by the spring for coming into contact with and presses the uneven cam surface of the star cam.

12. The synchronizer-mechanism-equipped transmission of claim 8, wherein the sleeve teeth are tapered at both ends thereof in a longitudinal direction by a pair of chamfered surfaces, and
wherein the chamfered surfaces intersect each other at an obtuse angle.

13. The synchronizer-mechanism-equipped transmission of claim 12, wherein an end portion of each of the ring teeth on a side of the sleeve teeth is formed by chamfered surfaces.

* * * * *